United States Patent
Yoneda et al.

(10) Patent No.: US 7,776,941 B2
(45) Date of Patent: Aug. 17, 2010

(54) OIL-BASED INK COMPOSITION FOR WRITING INSTRUMENTS

(75) Inventors: Shigeki Yoneda, Neyagawa (JP); Takeshi Omatsu, Kyotanabe (JP)

(73) Assignee: Sakura Color Products Corporation, Osaka-shi (JP)

( * ) Notice: Subject to any disclaimer, the term of this patent is extended or adjusted under 35 U.S.C. 154(b) by 471 days.

(21) Appl. No.: 11/920,797

(22) PCT Filed: May 23, 2006

(86) PCT No.: PCT/JP2006/310192

§ 371 (c)(1),
(2), (4) Date: Nov. 20, 2007

(87) PCT Pub. No.: WO2006/126510

PCT Pub. Date: Nov. 30, 2006

(65) Prior Publication Data

US 2009/0234069 A1  Sep. 17, 2009

(30) Foreign Application Priority Data

May 25, 2005  (JP) ............................. 2005-152433

(51) Int. Cl.
*C09D 11/16* (2006.01)
(52) U.S. Cl. .................... 523/161; 524/211; 106/31.13; 106/31.93; 401/141; 401/142
(58) Field of Classification Search ................. 401/141, 401/142; 523/161; 106/31.13, 31.93; 524/211
See application file for complete search history.

(56) References Cited

FOREIGN PATENT DOCUMENTS

| JP | 2001-158869 | 6/2001 |
|---|---|---|
| JP | 2006-160735 | 6/2006 |
| JP | 2006-161043 | 6/2006 |

OTHER PUBLICATIONS

Hajas et al., "Modified urea thickeners—now also for aqueous systems," Paintindia ANNUAL, 2003, pp. 151-158.
Office Action issued by the State Intellectual Property Office of China on Nov. 13, 2009 in corresponding Chinese Application No. 2006800183241, with English translation.
International Search Report for International Publication No. PCT/JP2006/310192 dated Jul. 25, 2006.

*Primary Examiner*—Ling-Siu Choi
*Assistant Examiner*—Vu A Nguyen
(74) *Attorney, Agent, or Firm*—Hamre, Schumann, Mueller & Larson, P.C.

(57) ABSTRACT

An oil-based ink composition for writing instruments is provided that is capable of improving storage stability of an ink, while maintaining a leveling property even when a soluble gelling agent is used. The oil-based ink composition for writing instruments comprises a colorant, a resin, an organic solvent and a gelling agent, wherein said organic solvent(s) is (are) hydrocarbons solvent(s), and in particular, at least one species of the solvent selected from the group of aliphatic hydrocarbons solvent(s), alicyclic hydrocarbons solvent(s), aromatic hydrocarbons solvent(s), and halogenetad hydrocarbons solvent(s), said gelling agent(s) comprises (comprise) soluble gelling agent(s) soluble to the above organic solvent(s) and insoluble gelling agent(s) insoluble to the above organic solvent(s), and the above insoluble gelling agent(s) is (are) urea-modified thixotropic agent(s).

2 Claims, No Drawings

OIL-BASED INK COMPOSITION FOR WRITING INSTRUMENTS

BACKGROUND OF THE INVENTION

1. Field of the Invention

The present invention relates to an oil-based ink composition for writing instruments and in particular, the present invention relates to the oil-based ink composition for writing instruments that can preferably be used as a gel ink for correction pens that requires no stirring.

2. Description of the Prior Art

Conventionally, oil-based inks for writing instruments that comprise coloring pigments, resins, nonpolar organic solvents, and soluble gelling agents that are soluble to said nonpolar organic solvents have been provided in Patent Document 1 (Japanese Laid-Open Patent Publication 2001-158869). And usually, in gel inks, both storage stability and a leveling property (brush coating and writing performance) of the inks are achieved by increasing static viscosity and decreasing kinematic viscosity.

However, when a single gelling agent is used, usually, said storage stability and said leveling property are in conflicting relationship and so, when one of them shows preference, the other gets worse. In other words, when an ink viscosity is increased by such a soluble gelling agent, the sedimentation of particles of the coloring pigments can be prevented and the storage stability increases, while on the other hand, the leveling property is deteriorated by this effect of increased viscosity upon coating, thereby degrading coating performance and writing performance. On the other hand, when such a soluble gelling agent is used that would set the ink viscosity low, although the leveling property is improved, the storage stability is degraded since the prevention of particle sedimentation of the coloring pigments gets unsatisfactory. As mentioned above, in the oil-based ink for writing instruments that includes coloring pigments, resins, organic solvents, and soluble gelling agents, when a single gelling agent is used, the storage stability and the leveling property of the ink are in trade-off relationship and there used to be a problem of when one is given priority, the other gets worse. From such a view point, conventionally, a single gelling agent was used within such a range that can adjust each of the characteristics.

The object of the present invention is to provide an oil-based ink composition for writing instruments that can further improve the storage stability of the ink while maintaining the leveling property even when said soluble gelling agent is used.

SUMMARY OF THE INVENTION

As a result of intensive studies, the inventors have found that the above mentioned problem can be solved by combining the use of a urea-modified thixotropic agent as an additive agent for increasing the static viscosity, while inhibiting the increase in kinematic viscosity.

The present invention relates to an oil-based ink composition for writing instruments comprising colorant(s), resin(s), organic solvent(s), and gelling agent(s), wherein said organic solvent(s) are hydrocarbons solvent(s), in particular, at least one of the organic solvent(s) selected from the group of aliphatic hydrocarbons solvent(s), alicyclic hydrocarbons solvent(s), aromatic hydrocarbons solvent(s), and halogenated hydrocarbons solvent(s), said gelling agent(s) include soluble gelling agent(s) soluble to the above mentioned organic solvent(s) and insoluble gelling agent(s) not soluble to the above mentioned organic solvent(s), and the above mentioned insoluble gelling agent(s) are urea-modified thixotropic agent(s).

As said soluble gelling agent, aluminum 2-ethylhexanoate is preferable and as said urea-modified thixotropic agent(s), urea-urethane resin(s) are preferable.

DESCRIPTION OF THE PREFERRED EMBODIMENTS (Colorants)

As colorants, they are not specifically limited. Various types of white-colored or colored pigments and the like can be used. To be specific, inorganic pigments, organic pigments, resin particle pigments, fluorescent pigments, glittering pigments, light storing pigments, two-tone colored pigments, and the like can be used. For example, as inorganic pigments or organic pigments, titanium dioxide, aluminum powder, brass powder, alkylene bismelamine, copper phthalocyanine pigments, threne pigments, azo pigments, quinacridone pigments, anthraquinone pigments, dioxane pigments, indigo pigments, thioindigo pigments, perynone pigments, perylene pigments, indolenone pigments, azomethine pigments, and the like can be cited. And as glittering pigments, glass flake pigments, metal coated pigments, and the like can be cited. As for others, as resin particle pigments, resin particle pigments colored by pigments or dyes can be used. Further, as colorants, dyes (including direct dyes, acid dyes, basic dyes, and the like) can also be used. These colorants can be used either alone or in combinations of two or more of them.

However, titanium dioxide with large specific gravity which is poor in dispersal stability and has the strong inclination to sedimentation and separation at the bottom of the container in a settled state can be used as the most suitable colorant in carrying out the present invention. As for titanium dioxide, any types can be used including rutile titanium dioxide, anatase titanium dioxide, and the like, however, in using titanium dioxide for a correction liquid, rutile titanium dioxide with much opacifying property is particularly preferable.

The colorants in the present invention, particularly titanium dioxide, are preferably contained in 20 to 65 wt % with respect to the ink composition. Particularly, in the case of a correction ink, the colorants to act as opacifying agents are preferably contained in 35 to 63 wt % with respect to the total amount of the ink from a practical point of view and the optimum range is 40 to 55 wt % with respect to the total amount of the ink. When colorants as opacifying agents are contained in less than 20 wt % with respect to the total amount of the ink, it is difficult to obtain satisfactory opacifying power. When the colorants as opacifying agents are contained in greater than 65 wt % with respect to the total amount of the ink, the viscosity becomes so high that it is difficult to obtain appropriate brush coating and writing performance. As for other colorants, an appropriate amount may be compounded in accordance with the use.

(Resins)

As for resins which can be used in accordance with the present invention, such resins may be used that show solubility to the organic solvent, adhesion to the coated film forming surface or coated surface (written surface) or dispersibility of the colorants, that is, publicly known resins such as coated film forming resins, binder resins, dispersing resins, and the like and in particular, the ones having compatibility with soluble gelling agents and insoluble gelling agents. Examples include alkylphenol resin, rosin-modified resin, alkyd resin, unsaturated thermoplastic resin elastomer, saturated thermoplastic elastomer, petroleum resin, terpene resin, and the like. These can be selected appropriately in accordance with the required character and the like of the coated film and can be used either alone or in combinations of two or more of them.

The amount of the resins to be contained is not specifically limited and may be decided in accordance with the concentration of the colorants, but these resins preferably are contained in 0.5 to 20 wt % with respect to the total amount of the ink and more preferably, 2 to 10 wt % with respect to the total amount of the ink practically. When these resins are contained in less than 0.5 wt % with respect to the total amount of the ink, the fixability of the colorants to the coated surface is degraded. When these resins are contained in greater than 20 wt % with respect to the total amount of the ink, the viscosity becomes so high that it gets difficult to obtain appropriate brush coating and writing performance.

(Organic Solvents)

As organic solvents to be used in the present invention, hydrocarbons solvents that can achieve the solubility of said resins and dryness of the coated films can be used and in particular, at least one selected from the group of aliphatic hydrocarbons solvents, alicyclic hydrocarbons solvents, aromatic hydrocarbons solvents, halogenated hydrocarbons solvents, and the like can be used.

In the case of the oil-based ink composition of the present invention compounding such soluble gelling agents as aluminum 2-ethylhexanoate, while it is difficult to form already mentioned three-dimensional mesh structure (gel structure) by the micelle with polar organic solvents including alcohol solvents such as propyl alcohol and the like, ketone solvents such as methyl ethyl ketone, and the like, in the case of non-polar solvents as hydrocarbons solvents, in particular, non-polar solvents such as aliphatic hydrocarbons solvents, alicyclic hydrocarbons solvents, aromatic hydrocarbons solvents, halogenated hydrocarbons solvents, and the like, the above mentioned three-dimensional mesh structure (gel structure) can be formed more easily, thereby capable of fully developing the inhibition effect of the sedimentation and separation of the colorants.

In the case of oil-based ink composition in this invention compounding soluble gelling agents including aluminum 2-ethylhexanoate and the like, in particular, cyclohexane, methyl cyclohexane, ethyl cyclohexane, cyclopentane can preferably be used among alicyclic hydrocarbons solvents as a correction liquid from the viewpoint of being difficult to dissolve the writing lines and of dryness, but what is more important is that such solvents should also provide the environment to easily form the three-dimensional mesh structure (gel structure) in the system with respect to the soluble gelling agents like aluminum 2-ethylhexanoate.

For example, the same can be applied to aliphatic hydrocarbons solvents, particularly to iso-heptane, n-heptane, iso-octane, n-octane, and the like.

As for organic solvents, quickly drying organic solvents are preferable. In particular, when such quickly drying organic solvents whose vapor pressure is at least 20 mm Hg (20° C.), preferably 20 to 300 mmHg (20° C.) are used in the oil-based ink of the present invention, particularly in the correction ink of the present invention that includes opacifying pigments such as titanium dioxide and the like in the ink composition, since the pseudo-plasticity fluidity property is given to the ink, fluidity is shown when writing, but after writing quickly dries losing the fluidity, it can be instantly written again on the opacified surface. Therefore, they are preferable as correction inks. These quickly drying organic solvents include, in addition to cyclohexane, methyl cyclohexane, ethyl cyclohexane, and cyclopentane as previously mentioned, iso-hexane, iso-heptane, iso-octane, and n-octane can be cited, however, in view of quick dryness and pseudo-plasticity fluidity of the gelling agents, cyclohexane, methylcyclohexane, ethylcyclohexane, cyclopentane are preferable, and particularly methylcyclohexane is preferable.

In the case of organic solvents, particularly of hydrocarbons solvents including aliphatic hydrocarbons solvents, alicyclic hydrocarbons solvents, aromatic hydrocarbons solvents, halogenated hydrocarbons solvents, and the like, they are preferably compounded in 10 to 65 wt % with respect to the total amount of the ink and the optimum range is 30 to 60 wt % with respect to the total amount of the ink. When these organic solvents are compounded in less than 10 wt % with respect to the total amount of the ink, the viscosity gets so high that it gets difficult to obtain appropriate brush coating and writing performance. On the other hand, when they are compounded in greater than 65 wt % with respect to the total amount of the ink, opacifying property by the colorants is degraded and so is the practicality when the colorants are used as opacifying agents.

For information, when the soluble gelling agents such as aluminum 2-ethylhexanoate are dissolved in said organic solvents such as alicyclic hydrocarbons solvents, by adding solubilizing agents including alcohols such as ethanol, propanol, isopropanol, and the like, amine such as monoethyl amine, diethyl amine, triethyl amine, and the like, phenol, ester phosphate surface active agent, and the like, said soluble gelling agents get solved more easily. These solubilizing agents are preferably compounded in 0.1 to 10 wt % with respect to the total amount of the ink from a practical view point, and the optimum range is 0.2 to 5 wt % with respect to the total amount of the ink. When these solubilizing agents are compounded in less than 0.1 wt % with respect to the total amount of the ink, the solution concentration is so low that it is difficult to obtain satisfactory anti-settling effect of the coloring pigments (particularly opacifying pigments). On the other hand, when these solubilizing agents are compounded in greater than 10 wt % with respect to the total amount of the ink, the viscosity gets so low that the coloring pigments (particularly, opacifying pigments) are liable to settle.

(Soluble Gelling Agents)

As aforementioned, the soluble gelling agents used in the present invention are the gelling agents that form a three-dimensional mesh structure (gel structure) in the ink with surface active function that is partially dissolved in said organic solvents and take the colorants in this three-dimensional mesh structure (gel structure), while on the other hand, they or the gelling agents decrease the viscosity by the shear force at the time of writing.

The gelling agents having the surface activity include certain types of metal soaps, but gelling agents used in the present invention are preferably the soluble ones having a solubility (20° C.) from 0.1 to 20 wt % in said organic solvents. That is, the gelling agents must be the ones having the molecular structure of polar group and non-polar group whose solubility (20° C.) is from 0.1 to 20 wt % in the organic solvents, and providing the pseudo-plasticity fluidity property. In such gelling agents, the three dimensional structure is assumed to have dispersal stability in the state of high viscosity, taking the colorants including pigment particles and the like, in the micellar structure. And when a shear force is applied to the ink when writing, fluidization occurs with lower viscosity, thereby showing the said leveling property and writing performance.

Such soluble gelling agents having these attributes can be used in this invention. Examples include sorbitol derivatives including dibenzylidene sorbitol and the like, dextrin fatty ester, hydrogenated castor oil, 1,2-hydroxystearic acid, gelling agents of polyether ester-type surfactant, and the like. As the most preferable soluble gelling agent, aluminum 2-ethylhexanoate can be exemplified. In the case of this aluminum 2-ethylhexanoate, it is assumed that the molecules of aluminum 2-ethylhexanoate form coordinate bonding due to the existence of aluminum metal and the three dimensional mesh structure (gel structure) by micelle of the coordinate bond of aluminum 2-ethylhexanoate is formed within the ink and colorants are taken in this gel structure, thereby preventing the sedimentation of colorants. In addition, the oil-based ink that compounds this aluminum 2-ethylhexanoate, in particular, the correction ink has high static viscosity but has a thixotropic property in which the viscosity gets lower as the shear rate increases, assumingly caused by the three dimensional mesh structure (gel structure) by the above mentioned micelle.

As aluminum 2-ethylhexanoate, monosoap types and disoap types, and trisoap types can be exemplified. The composition of the present invention is not specifically limited to any one of the monosoap types, disoap types, and trisoap types, but to use aluminum 2-ethylhexanoate of the disoap types alone or as a main component is preferable. In the case of aluminum 2-ethylhexanoate of the disoap types, due to the molecular structure of the disoap, it is easier to form a gel structure in the system of oil-based inks, and compared to the monosoap types and trisoap types, the dispersal stability for the colorants (including titanium dioxide, coloring pigments and the like) is particularly excellent.

The content of the soluble gelling agents in the ink composition is not specifically limited. For example, it can be adjusted properly in accordance with the other compounds including the content or the types of organic solvents, and the like. To be specific, in the case of the oil-based ink composition including correction liquid using alicyclic carbohydrate solvents, such as methylcyclohexane and the like, the content of the gelling agents like aluminum 2-ethylhexanoate and the like is preferably 0.05 to 5 wt % with respect to the total amount of the ink from a practical view point and the optimum range is 0.5 to 2 wt %. When gelling agents including aluminum 2-ethylhexanoate are contained in less than 0.05 wt % with respect to the total ink, despite the excellence in brush coating and writing performance, the contained amount of compound is so little that the dispersal stability for the colorants becomes poor and it is difficult to have thixotropic property since it is difficult for the oil-based ink system to form the mesh structure. On the other hand, when the gelling agents including aluminum 2-ethylhexanoate are contained in greater than 5 wt % with respect to the total ink, despite the dispersal stability for the colorants and thixotropic property, the contained amount of compound is so much that the viscosity becomes too high and it is difficult to obtain good brush coating and writing performance.

(Insoluble Gelling Agents)

In the present invention, in addition to said soluble gelling agents, insoluble gelling agents are further used together. As insoluble gelling agents, gelling agents that are not soluble in at least one species of hydrocarbons organic solvent selected from the group of aliphatic hydrocarbons solvents, alicyclic hydrocarbons solvents, aromatic hydrocarbons solvents, and halogenated hydrocarbons solvents and in which microcrystalline forms pseudo-plasticity three-dimensional structure are preferable. As such gelling agents, urea-modified thixotropic agents are preferable. To be specific, urea-urethane resins are used. In particular, trade names "byk-411" provided by BYK Japan KK are preferable. Further, thixoropic agents for coated compositions described in the claims of Japanese Laid-Open Patent Publication S54-156040 are preferable.

The above mentioned insoluble gelling agents are preferably contained in 0.01 to 0.3 wt % with respect to the total amount of the ink from the practical view point and the optimal range is 0.05 to 0.2 wt % with respect to the total amount of the ink. When the above mentioned insoluble gelling agents are contained in less than 0.01 wt % with respect to the total amount of the ink, it is difficult to obtain the satisfactory anti-settling effect. On the other hand, when the above mentioned insoluble gelling agents are contained in greater than 0.3 wt %, the viscosity gets high, making it difficult to obtain appropriate writing performance.

(Ink Viscosity)

When the viscosity of the ink is less than 700 mPa·s with a shear force of 0.1(1/s), the viscosity is so low that it becomes difficult to achieve the satisfactory prevention of the sedimentation of the colorants, maybe because of the instability in catching the colorants such as the pigment particles and the like even though three dimensional mesh structure is formed by the gelling agents, thereby sometimes requiring redispersion by shaking or restirring. On the other hand, when the viscosity of the ink is greater than 500 mPa·s with a shear force of 100(1/s), the fluidity of the ink lowers in writing, making it difficult to maintain the excellent leveling property and writing performance.

Therefore, in the present invention, it is important that the ink viscosity is not less than 700 mPa·s with a shear force of 0.1(1/s) and that the ink viscosity is not greater than 500 mPa·s with a shear force of 100(1/s).

However, from the above mentioned point, the preferable range of the ink viscosity of the present invention is not less than 900 mPa·s with a shear force of 0.1 (1/s) and that the ink viscosity is not greater than 250 mPa·s with a shear force of 100(1/s).

The viscosity shown in the present invention is the value measured by the Z20DIN rotor at a temperature of 20° C. using the rheometer RS-75 manufactured by HAAKE Inc. The viscosity of this ink is desirably achieved by soluble gelling agents but other viscosity modifiers can be used.

For information, various types of dispersions and surface active agents in addition to fine silica flours to improve the coating and plastic pigments to adjust the flow property can be added.

As the dispersions used in the present invention, such dispersions are preferable that secure the dispersal property of the colorants (opacifying agents), that have compatibility with said gelling agents and said resins, and that do not let drawings or letters illustrated on the base dissolve. In the case of the oil-based ink of the present invention comprising a nonionic type surface-active agent, compared with the oil-based ink not containing said surface-active agent, the above mentioned required characteristics can be fulfilled, and dispersal stability for the colorants, particularly that for the pigment particles and for the pigment particles of titanium dioxide in the ink and the fluidity of the ink can be further enhanced. This nonionic type surface-active agent is not specially limited, but higher alcohol ethylene oxide addition products, alkylphenol ethylene oxide addition products, and sorbitan aliphatic acid ester are preferable. As the higher alcohol ethylene oxide addition products, polyoxyethylene lauryl ether, and polyoxyethylene stearyl ether can be cited. As the alkylphenol ethylene oxide addition products, polyoxyethylene nonyl phenyl ether and polyoxyethylene octyl phenyl ether can be cited. As sorbitan aliphatic acid ester, sorbitan monolaurate, sorbitan monooleate, sorbitan trioleate can be cited. In addition, the nonionic type surface-active agent preferably comprises from 0.3 to 5 wt % with respect to the total amount of the ink from the practical view point, and more preferably, 0.5 to 2 wt %. When the nonionic type surface active agent is contained in less than 0.3 wt % with respect to the total amount of the ink, the fluidity is degraded and appropriate brush coating and writing performance is degraded. On the other hand, when nonionic type surface active agent is contained in greater than 5 wt % with respect to the total amount of the ink, the viscosity is degraded and the coloring pigments (opacifying agents) are liable to settle.

Thus, since the gel-type oil-based ink of the present invention can show the excellent leveling property and can inhibit the sedimentation of the colorants, while maintaining the brush coating and the writing performance, it can be used for various writing instruments particularly including correction tools such as correction pens, brush-coating correction liquid, and the like, as well as oil-based ball-point pens and paint markers, regardless of whether they are pressurized or non-pressurized.

EXAMPLE

The oil-based inks of the Examples and Comparative Examples were test produced based on the compounding composition of the Table 1. First, the resin was added to organic solvents and was stirred and dissolved, followed by adding soluble gelling agents and stirring, thereafter adding the solubilizing agents of the soluble gelling agents, heating and stirring, fully dissolving the soluble gelling agents, thereby preparing the resin liquid. For information, stirring was made using a dissolver.

Next, opacifying agents, opacifying aiding agents, dispersants, and solubilizing agents were added, followed by stirring with a dissolver, further followed by fully stirring with a bead mill, thereby preparing a pigment base.

Next, the above mentioned resin liquid and the above mentioned pigment base were mixed and stirred, to which insoluble gelling agents were put in while stirred, followed by further heating and stirring, leaving for a week at a temperature of 50° C. thereby preparing the prescribed oil-based ink. Each of the above mentioned stirring was made using a dissolver. For information, each of the compounding unit shown in the Table is represented by "parts by weight".

In the Table, titanium dioxide that is the coloring pigment (opacifying pigment) is manufactured by Titan Kogyo Co., Ltd. under the trade name of "Kronos KR-270", acrylic resin sphere, that is the opacifying aiding agent is manufactured by Soken Chemical & Engineering Co., Ltd. under the trade name of "MP-1000", aluminum 2- ethylhexanoate, that is the soluble gelling agent is manufactured by HOPE CHEMICAL CO., LTD., under the trade name of "OCTOPE Al-A", the rosin resin, that is the resin is manufactured by Arakawa Chemical Industries Ltd., under the trade name of "Pine crystal KE100", the nonionic type surface active agent is manufactured by Kao Corporation under the trade name of "RHEODOL SP-010", the urea-modified urethane resin, that is the insoluble gelling agent is manufactured by BYK Japan KK under the trade name of "byk-411", and the ester phosphate surface active agent that is the stabilizing agent is manufactured by NIHON SURFACTANT KOGYO KK under the trade name of "DDP-8".

(Manufacturing of Test Samples)

Next, the test samples were prepared by putting inks of each Example and Comparative Example in ink containment tubes of correction pens with pins with diameters of 0.5 mm and built-in springs with loads of 40 gf at pen tips and the storage stability, the leveling property, and the viscosity of the inks were evaluated.

The storage stability of the inks was evaluated based on the following criteria, with writing after leaving the pen tips upward at a temperature of 50° C. for 1 month.

○ for same as the initial stage.

X for transparent or thin beginning of writings.

The leveling property was evaluated by sensory assessment based on the following criteria writing on PPC paper (copier paper).

○ for without any thin spot.

X for with thin spots and discontinuity of written lines.

TABLE 1

| Composition | | | Example | | | | Comparative Example (parts by weight) | | |
|---|---|---|---|---|---|---|---|---|---|
| | | | 1 | 2 | 3 | 4 | 1 | 2 | 3 |
| Colorant, opacifying agent | Titanium dioxide | Kronos KR-270 | 45.00 | 45.00 | 45.00 | 45.00 | 45.00 | 45.00 | 45.00 |
| Opacifying aid | | Chemisnow MP-1000 | 5.00 | 5.00 | 5.00 | 5.00 | 5.00 | 5.00 | 5.00 |
| Resin | | Pine crystal KE100 | 4.00 | 4.00 | 4.00 | 4.00 | 4.00 | 4.00 | 4.00 |
| Nonionic surface active agent | | RHEODOL SP-O10V | 1.50 | 1.60 | 1.60 | 1.60 | 1.60 | 1.60 | 1.60 |
| Soluble gelling agent | aluminum 2-ethyl-hexaonate | OCTOPE Al-A | 1.40 | 1.40 | 1.40 | 1.40 | 0.50 | 2.00 | 1.40 |
| Solubilizing agent | | DDP-8 | 0.60 | 0.60 | 0.60 | 0.60 | 0.20 | 0.80 | 0.60 |
| Insoluble gelling agent | Urea-urethane resin | BYK411 | 0.05 | 0.10 | 0.15 | 0.30 | | | |
| Organic solvent | | Normal heptane | 28.45 | 28.30 | 28.25 | 28.10 | 29.70 | 27.60 | 28.40 |
| Organic solvent | | Isooctane | 14.00 | 14.00 | 14.00 | 14.00 | 14.00 | 14.00 | 14.00 |
| Total | | | 100.00 | 100.00 | 100.00 | 100.00 | 100.00 | 100.00 | 100.00 |
| Evaluation | | Viscosity by shear rate shear rate 0.1/sec | 2200 | 3400 | 5400 | 10000 | 300 | 10000 | 1100 |
| | | 100/sec | 120 | 150 | 200 | 250 | 50 | 500 | 80 |
| | | Leveling property | ○ | ○ | ○ | ○ | ○ | X | ○ |
| | | Storage property (50° C. for 1 month) | ○ | ○ | ○ | ○ | X | ○ | X |

Further, the viscosity was evaluated using the Z20DIN rotor at a temperature of 20° C. by the rheometer RS-75 manufactured by HAAKE Inc. with a shear speed of 0.1/sec and 100/sec, respectively.

From Table 1, the satisfactory characteristics in terms of the leveling property or storage stability were not obtained in any of the Comparative Examples that include no insoluble gelling agent. On the other hand, in the Examples, the leveling property is maintained and the storage stability of the ink is improved at the same time. These properties can be acknowledged to have improved the effects by comparing each of the measured values of the viscosity when the shear rate is 0.1/sec and 100/sec, respectively with those of the Comparative Examples.

EFFECT OF THE INVENTION

Since the present invention relates to the oil-based ink composition comprising hydrocarbons solvents, in particular, at least one species of the organic solvent selected from the group of aliphatic hydrocarbons solvents, alicyclic hydrocarbons solvents, aromatic hydrocarbons solvents, and halogenated hydrocarbons solvents and a soluble gelling agent that is soluble to said organic solvent and an insoluble gelling agent that is insoluble to said organic solvent that includes urea-modified thixotropic agent, it can achieve to increase the static viscosity while inhibiting the increase in kinematic viscosity, and therefore, it can improve storage stability of the ink, while maintaining the leveling property.

INDUSTRIAL APPLICABILITY

The ink composition of the present invention can preferably be used as inks for gel-type correction pens. Further, the oil-based ink composition of the present invention can be applied for inks for oil-based ball-point pens and inks for paint markers as well.

What is claimed is:

1. An oil-based ink composition for writing instruments comprising colorant(s), resin(s), organic solvent(s), and gelling agent(s),
    wherein said organic solvent (s) is (are) hydrocarbons solvent (s), and in particular, at least one species of the solvent selected from the group of an aliphatic hydrocarbons solvent (s), alicyclic hydrocarbons solvent (s), aromatic hydrocarbons solvent (s), and halogenated hydrocarbons solvent(s),
    said gelling agent(s) comprises (comprise) soluble gelling agent (s) soluble to the above organic solvent (s) and insoluble gelling agent(s) insoluble to the above organic solvent, and the above insoluble gelling agent is an urea-modified thixotropic agent.

2. The oil-based ink composition for writing instruments as set forth in claim 1, wherein said soluble gelling agent(s) is (are) contained in 0.05 to 5 wt % with respect to the total amount of the ink composition, and said insoluble gelling agent (s) is (are) contained in 0.01 to 0.3 wt % with respect to the total amount of the ink composition.

* * * * *